United States Patent [19]

Maemine

[11] Patent Number: 4,701,649
[45] Date of Patent: Oct. 20, 1987

[54] BRUSHLESS MOTOR WITH SYMMETRICAL LEADS FOR PREVENTING SIGNAL DISTORTION

[75] Inventor: Kenji Maemine, Kakuda, Japan

[73] Assignee: Alps Electric Co., Ltd., Japan

[21] Appl. No.: 892,951

[22] Filed: Aug. 4, 1986

[30] Foreign Application Priority Data

Aug. 2, 1985 [JP] Japan .................. 60-119512[U]

[51] Int. Cl.$^4$ ............................................. H02K 21/24
[52] U.S. Cl. .................... 310/68 R; 310/171; 310/265
[58] Field of Search ............ 29/596; 310/71, 171, 310/268, DIG. 6, 68 R, 68 B, 156; 339/17 F

[56] References Cited

U.S. PATENT DOCUMENTS 4,093,897  6/1978  Fujita et al. ................... 310/268
4,260,920  4/1981  Nakamura et al. ............ 310/68 R
4,359,657 11/1982  Matsumoto et al. ............ 310/71

Primary Examiner—Patrick R. Salce
Assistant Examiner—D. L. Rebsch
Attorney, Agent, or Firm—Guy W. Shoup

[57] ABSTRACT

In a brushless motor, a magnetizing member for rotation driving with N-poles and S-poles arranged alternately is formed on a flat plane portion of a rotor magnet, and a member for detecting the rotational speed with N-poles and S-poles arranged alternately at a smaller pitch and a magnetizing member for detecting the rotational position arranged at a spacing angle of 180° are formed on a circumferential surface of the rotor magnet. Stator coils are located opposite the magnetizing member for rotation driving, and a detecting substrate surrounds the outer circumference of the rotor magnet. The detecting substrate is provided with a rotational speed detecting pattern (FG) and a rotational position detecting pattern (PG), and a pair of lead patterns are connected to both ends of the rotational speed detecting pattern and inclined with respect to the rotational direction, so as to cancel distorting signals from the position poles.

1 Claim, 10 Drawing Figures

BRUSHLESS MOTOR WITH SYMMETRICAL LEADS FOR PREVENTING SIGNAL DISTORTION

BACKGROUND OF THE INVENTION

1. Field of the Invention

The present invention relates to a brushless motor which is installed as a drive member of a compact disc player, a tape player or the like.

2. Description of the Prior Art

FIG. 4 is a sectional view of a brushless motor in the prior art illustrating its schematic structure.

Numeral 1 designates a rotary shaft. The rotary shaft 1 is rotatably supported by a thrust bearing 2 and a radial bearing 3. A rotor yoke 4 is fixed to the rotary shaft 1, and a ring-shaped rotor magnet 5 is fixed to a lower surface of the rotor yoke 4. A coil substrate 7 is fixed on the stationary plate 6. The coil substrate 7 is a flexible substrate. A plurality of stator coils 8 are fixed on an upper surface of the coil substrate 7. The stator coils 8 are wound in nearly square form and arranged at regular intervals as shown in FIG. 5. Current is supplied to each stator coil 8 by a lead pattern formed on the coil substrate 7.

As shown in FIG. 6, the rotor magnet 5 comprises a main magnetizing member 5a for rotation driving, formed on a flat plane portion opposed to the stationary plate 6. In the main magnetizing member 5a, N-poles and S-poles are alternately arranged in the circumferential direction and magnetized. The stator coil 8 is constituted so that current flows in the radial direction at linear parts 8a and 8b. Electromagnetic force in the rotational direction acts on the rotor magnet 5 according to the current flowing through the linear parts 8a and 8b and the polarity of the main magnetizing member 5a opposed to the current.

As shown in FIG. 7, an FG, (frequency generating) magnetizing member 5b for detecting the rotational speed is formed on a circumferential surface of the rotor magnet 5. In the FG magnetizing member 5b, N-poles and S-poles are alternately formed in the circumferential direction at a shorter pitch than that of the main magnetizing member 5a. A pair of PG magnetizing members 5c and 5d for detecting the rotational position are formed also on the circumferential surface of the rotor magnet 5. The PG magnetizing members 5c and 5d have different polarity N and S, and are arranged at a spacing of 180°.

As shown in FIG. 4 and FIG. 7, a detecting substrate 9 surrounds the periphery of the rotor magnet 5. FIG. 8 shows the detecting substrate 9 in a planar view. The detecting substrate 9 is provided with an FG pattern 10 for detecting the rotational speed and a PG pattern 11 for detecting the rotational position. The FG pattern 10 is opposed to the FG magnetizing member 5b of the rotor magnet 5, and a plurality of detecting parts 10a are formed continuously at the same pitch as the magnetizing pitch of the FG magnetizing member 5b. If the rotor magnet 5 is rotated, pulses are outputted from the FG pattern 10 corresponding to the magnetic poles of the FG magnetizing member 5b. The PG pattern 11 is formed at one position in a U-like shape. The PG pattern 11 is oppossed to the position where the PG magnetizing members 5c, 5d pass. If the rotor magnet 5 is rotated and the PG magnetizing member 5c or 5d passes, pulses corresponding to the polarity of N or S are outputted from the PG pattern 11 whereby the rotational position of the rotor magnet 5 can be recognized.

The detecting substrate 9 shown in FIG. 8 is provided with the FG lead patterns 10b and 10c connected to both ends of the FG pattern 10, and the PG lead patterns 11a and 11b connected to both ends of the PG pattern 11. The FG lead pattern 10b and the PG lead pattern 11a are connected and used as the common lead. The FG pattern 10c and the PG lead pattern 11b extend individually to the edge portion of the detecting substrate 9.

In the detecting substrate 9 shown in FIG. 8, part of the FG lead patterns 10b and 10c corresponding to the length A overlaps the passing route of the PG magnetizing members 5c and 5d of the rotor magnet 5. Consequently, every time the PG magnetizing members 5c, 5d pass the FG lead pattern 10b or 10c, electromotive force acts on the FG lead pattern 10b, 10c, whereby unwanted current flows through the FG pattern 10. Thus regular distortion as shown in FIG. 9 is produced in the rotational speed detecting pulses P taken from the FG pattern 10.

SUMMARY OF THE INVENTION

In view of above-mentioned disadvantages in the prior art, an object of the invention is to provide a brushless motor wherein even if a magnetizing member for detecting the rotational speed passes opposing to a lead portion of a rotational speed detecting pattern of a detecting substrate, the influence of electromotive force produced in the lead is small, whereby distortion in output pulses for detecting the rotational speed is prevented and the detecting accuracy is improved.

The invention consists in a brushless motor, wherein a magnetizing member for rotation driving the N-poles and S-poles arranged alternately is formed on flat plane portion of a rotor magnet supported rotatably, a magnetizing member for detecting the rotational speed with N-poles and S-poles arranged alternately at smaller pitch than that of the magnetizing member for rotation driving and a magnetizing member for detecting the rotor rotational position arranged at an angle of 180° are formed on a circumferential surface of the rotor magnet. Stator coils opposed to the magnetizing member for rotation driving of the rotor magnet and a detecting substrate surrounding the outer circumference of the rotor magnet are formed on stationary position of facing respective portions of the rotor. The detecting substrate is provided with a rotational speed detecting pattern in opposition to the magnetizing member for detecting the rotational speed and a rotational position detecting pattern in opposition to the magnetizing member for detecting the rotational position. The detecting substrate is provided with a pair of lead patterns which are connected to both ends of the rotational speed detecting pattern, and are angularly inclined with respect to the rotational direction of the rotor magnet.

In the invention, since the lead patterns connected to the rotational speed detecting pattern of the detecting substrate are inclined with respect to the rotational direction, even if electromotive force is generated in the lead patterns by the magnetizing member for detecting the rotational speed while the rotor magnet is rotated, only a small current component corresponding to the inclination angle flows through the lead patterns, whereby the output of rotational speed detecting pulses is not significantly affected.

DESCRIPTION OF THE PREFERRED EMBODIMENT

An embodiment of the invention will now be described referring mainly to FIGS. 1 through 3.

Figure 1:
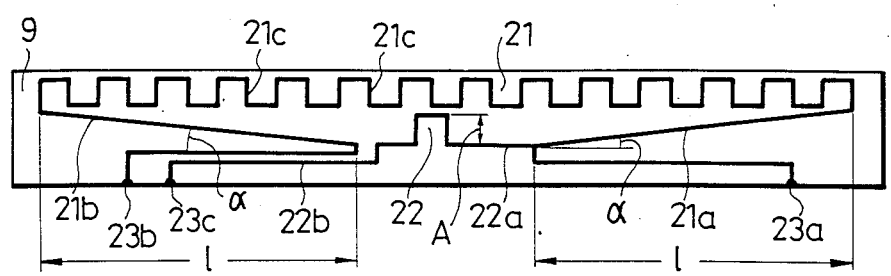
FIG. 1 is a planar view of a detecting substrate of a brushless motor according to the invention.
Figure 2:
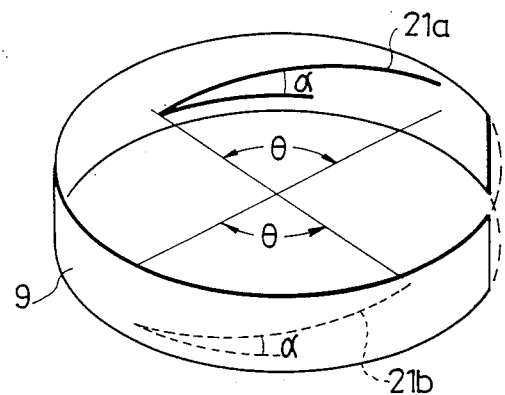
FIG. 2 is a perspectivve view of the detecting substrate.
Figure 3:
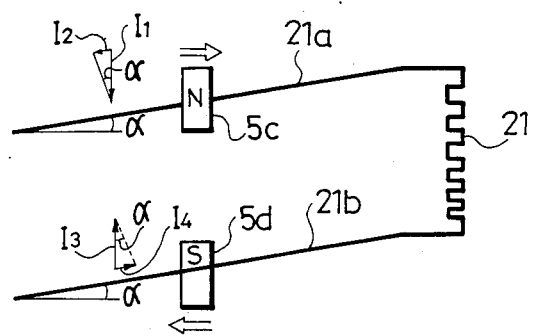
FIG. 3 is a diagram illustrating electromotive force generated when magnetizing members for detecting the rotational position pass through the leads.

FIG. 1 is a planar view of a detecting substrate of a brushless motor according to the invention, FIG. 2 is a perspective view of the detecting substrate, and FIG. 3 is a diagram illustrating the influence of the PG (positive generating) on the magnetizing members to lead patterns.

Figure 4:
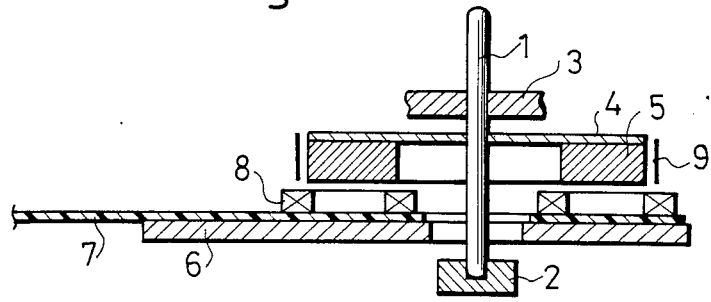
FIG. 4 is a sectional view illustrating the conventional structure of a brushless motor.
Figure 5:
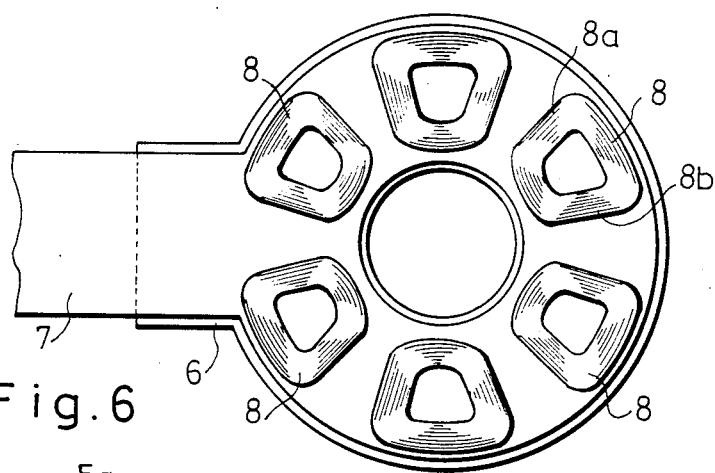
FIG. 5 is a plan view of the brushless motor illustrating a coil mounting part.

The basic structure of the brushless motor of the invention is similar to that of the prior art as shown in FIG. 4. That is, a rotary shaft 1 is rotatably supported by a thrust bearing 2 and a radial bearing 3, and a rotor yoke 4 and a rotor magnet 5 are fixed to the rotary shaft 1.

Figure 6:
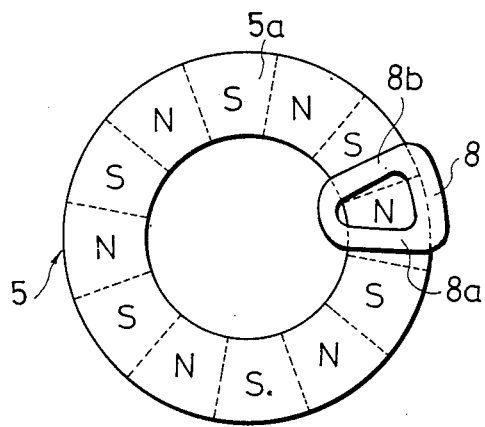
FIG. 6 is a plan view of a rotor magnet.
Figure 7:
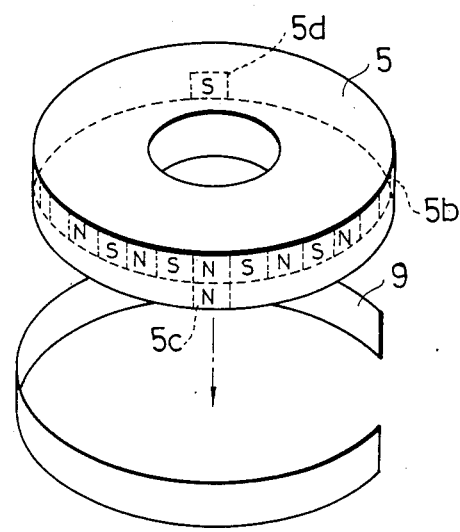
FIG. 7 is a perspective view illustrating the rotor magnet and the detecting substrate.
Figure 8:
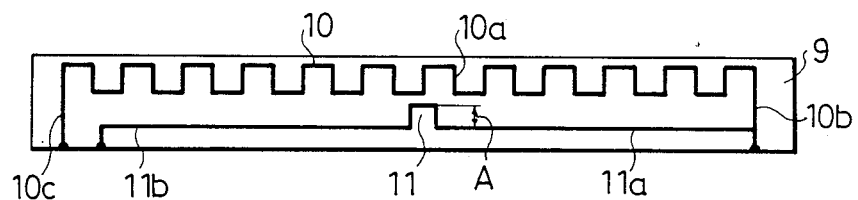
FIG. 8 is a planar view of a detecting substrate in the prior art.
Figure 9:
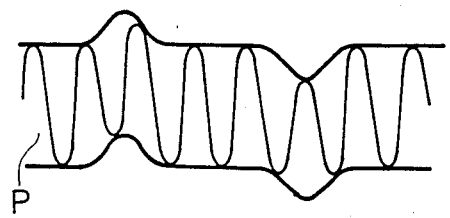
FIG. 9 is a diagram illustrating rotational speed detecting pulses of the brushless motor in the prior art.

A coil substrate 7 is fixed on a stationary plate 6, and a plurality of stator coils 8 are fixed on an upper surface of the coil substrate 7. A detecting substrate 9 with a pattern formed as shown in FIG. 1 surrounds the periphery of the rotor magnet 5. The rotor magnet 5 has a main magnetizing member 5a for rotation driving on a flat plane portion opposed to the stator coils 8 as shown in FIG. 6. An FG magnetizing member 5b for detecting the rotational speed and PG magnetizing members 5c, 5d for detecting the rotational position are installed on the outer circumference of the rotor magnet 5 as shown in FIG. 7. In the main magnetizing member 5a, N-poles and S-poles are alternately arranged in the circumferential direction and magnetized. The stator coils 8 are opposed to the main magnetizing member 5a. In the FG (frequency generating) magnetizing member 5b, N-poles and S-poles are alternately magnetized in the circumferential direction at a shorter pitch than that of the main magnetizing member 5a. The PG magnetizing members 5c and 5d have different polarity N and S, and are arranged at a spacing of 180°.

As shown in FIG. 1, the detecting substrate 9 is made of a flexible substrate in elongated form. The detecting substrate 9 is provided with an FG pattern 21 for detecting the rotational speed and a PG pattern 22 for detecting the rotational position. The FG pattern 21 is opposed to the FG magnetizing member 5b of the rotor magnet 5, and a plurality of detecting parts 21c are formed continuously at the same pitch as the magnetizing pitch of the FG magnetizing member 5b. The PG pattern 2 is formed at one position in U-like shape. The PG pattern 22 is opposed to the position where the PG magnetizing members 5c, 5d pass.

The detecting substrate 9 is also provided with FG lead patterns 21a and 21b connected to both ends of the FG pattern 21. The FG lead patterns 21c and 21b are inclined by a small angle α with respect to the longitudinal direction of the detecting substrate 9, i.e., the rotational direction of the rotor magnet 5. The two FG lead patterns 21a and 21b have equal length l in the inclined part. The inclined part is formed within height A of the part where the PG magnetizing members 5c and 5d of the rotor magnet 5 pass. One FG lead pattern 21a together with a PG lead pattern 22a extending from one end of the PG pattern 22 is connected to a common point 23a at the edge portion of the detecting substrate 9. The other FG lead pattern 21b is connected to point 23b. Other PG lead pattern 22b connected to the other end of the PG pattern 22 is connected to a further point 23c.

As shown in FIG. 7, the detecting substrate 9 is arranged to surround the outer circumference of the rotor magnet 5. Then, the two FG lead patterns 21a and 21b inclined as shown in FIG. 2 are arranged symmetrically with respect to the rotor magnet and at the same angle θ.

Operation of the brushless motor will be described.

Current flows through each coil 8 in clockwise and counterclockwise directions alternately. More specifically, a Hall element or the like detects the polarity of the main magnetizing member 5a of the rotor magnet 5 positioned thereon, and current flows through each coil 8 in clockwise and counterclockwise directions to the direction of the polarity. Electromotive force in the rotational direction is produced by current flowing through the linear parts 8a and 8b of the coils 8 and the magnetic field generated by the magnetizing member 5a of the rotor magnet 5, whereby the rotor magnet 5 and the yoke 4 and the rotary shaft 1 are driven to rotate.

Figure 10:
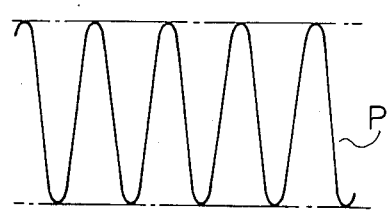
FIG. 10 is a diagram illustrating rotational speed detecting pulses of the brushless motor according to the invention.

In the FG pattern 21 on the detecting substrate 9, current flows corresponding to the polarity during passing of the FG magnetizing member 5b formed on the outer circumference of the rotor magnet 5. The current flows through the FG lead patterns 21a and 21b, and the rotational speed detecting pulses P as shown in FIG. 10 are outputted. The rotational speed of the motor is detected by counting the output pulses. In a compact disc player or the like, current flowing through the coils 8 is controlled corresponding to the detected rotational speed, whereby the rotational speed of the disc drive member is controlled. In the PG pattern 22 on the detecting substrate 9, current flows corresponding to the polarity during passing of the PG magnetizing member 5c or 5d of the rotor magnet 5. The current flows through the PG lead patterns 22a and 22b. The current pulses indicates where the PG magnetizing members 5c, 5d are positioned, that is, the rotational position of the rotor magnet 5 is located.

While the rotor magnet 5 is rotated, the PG magnetizing member 5c or 5d on the outer circumference of the rotor magnet 5 passes opposing the FG lead patterns 21a and 21b. Since the two FG lead patterns 21a and 21b are arranged symmetrically at angle θ as shown in FIG. 2, while one PG magnetizing member 5c passes the position opposite one FG lead pattern, the other PG magnetizing member 5d passes the position opposite the other FG lead pattern surely. As shown in FIG. 3, for example, when the PG magnetizing member 5c of the N-pole is moved opposite one lead pattern 21a, electromotive force shown by $I_1$ is generated. At the same time, the PG magnetizing member 5d of the S-pole is moved opposite the other lead pattern 21b, and electromotive force shown by $I_3$ is generated. Since the FG lead patterns 21a and 21b are inclined by the small angle $\alpha$, the component $I_2$ of the electromotive force $I_1$ in the direction along the FG lead pattern 21a and the component $I_4$ of the electromotive force $I_3$ in the direction along the FG lead pattern 21b are quite small. Consequently, the components $I_2$ and $I_4$ of the electromotive force do not significantly affect the rotational speed detecting pulse output from the FG pattern 21. Since the PG magnetizing members 5c and 5d do not produce unwanted current in the FG lead patterns 21a and 21b, the rotational speed detecting pulses are not distorted as shown in FIG. 10.

According to the invention as above described, since the leads of the rotational speed detecting pattern are not affected by the magnetic poles for detecting the rotational position of the rotor magnet, the rotational speed detecting pulses are not distorted. Furthermore, since the leads of the rotational speed detecting pattern are inclined, the leads can extend at any angle corresponding to length of the detecting substrate. Consequently, the leads can be easily formed in the detecting substrate of any size. Also the width of the detecting substrate can be made as small as possible.

What is claimed is:

1. A brushless motor comprising:
    a rotor supported rotatably having a radially extending planar surface and an outer circumferential surface;
    a first magnetic member formed on the planar surface of the rotor and composed of magnetic N-poles and S-poles alternately arranged at angular intervals;
    a second magnetic member extending along a first circumferential part of the circumferential surface of the rotor and composed of magnetic N-poles and S-poles alternately arranged at a smaller angular pitch than those of the first magnetic member;
    a third magnetic member composed of a pair of magnetic poles located 180° opposite each other on a second circumferential part of the circumferential surface of the rotor;
    stator coils formed on a stationary plane in parallel with the planar surface of the rotor and facing opposite said first magnetic member for driving the rotor in rotation when current is supplied to said coils;
    a detecting substrate formed on a stationary periphery around the outer circumferential surface of the rotor, said detecting substrate having a first conductive pattern extending circumferentially opposite the rotation path of said second magnetic member in which a current signal indicating the rotational speed of the rotor is generated, and a second conductive pattern located in at least one position opposite the rotation path of said third magnetic member,
    wherein said detecting substrate is provided with a pair of conductive leads which are connected to two ends of the first conductive pattern and which extend across a part of the substrate opposite the rotation path of the third magnetic member, said pair of leads being symmetrically inclined at a small angle with respect to the rotational direction of the rotor at least in said substrate part opposite the rotation path of the third magnetic member, such that distortion of the current signal generated in said first conductive pattern indicating the rotational speed of the rotor can be minimized.

* * * * *